United States Patent
Iwakuni et al.

(10) Patent No.: US 6,432,859 B1
(45) Date of Patent: Aug. 13, 2002

(54) METHOD OF PRODUCING EXHAUST GAS PURIFYING CATALYST AND CATALYST PRODUCED THEREBY

(75) Inventors: Hideharu Iwakuni; Makoto Kyogoku; Hiroshi Yamada; Akihide Takami, all of Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/458,949

(22) Filed: Dec. 10, 1999

(30) Foreign Application Priority Data

Dec. 11, 1998 (JP) .............................. 10-352823

(51) Int. Cl.$^7$ .......................... B01J 29/06; B01J 21/00; B01J 23/00; B01J 23/40; B01J 23/58

(52) U.S. Cl. ............... 502/66; 502/64; 502/74; 502/325; 502/326; 502/327; 502/328; 502/333; 502/334; 502/339; 502/340; 502/341; 502/527.12

(58) Field of Search ................ 502/302, 305, 502/306, 311, 313, 317, 325, 326, 328, 330, 339, 340, 344, 355, 60, 64, 66, 74, 304, 327, 333, 334, 341, 527.12; 423/213.2, 213.5, 239.1, 239.2

(56) References Cited

U.S. PATENT DOCUMENTS

| | | | | |
|---|---|---|---|---|
| 5,354,720 A | * | 10/1994 | Leyrer et al. ................. 502/64 |
| 5,402,641 A | * | 4/1995 | Katoh et al. .................. 60/285 |
| 5,409,671 A | * | 4/1995 | Takemoto et al. ........... 422/180 |
| 5,427,989 A | * | 6/1995 | Kanesaka et al. ............ 502/66 |
| 5,494,878 A | * | 2/1996 | Murakami et al. .......... 502/304 |
| 5,543,124 A | * | 8/1996 | Yokota et al. ............ 423/239.1 |
| 5,547,913 A | * | 8/1996 | Muramoto ................... 502/328 |
| 5,597,771 A | * | 1/1997 | Hu et al. ..................... 502/304 |
| 5,677,258 A | * | 10/1997 | Kurokawa et al. .......... 502/303 |
| 5,681,788 A | * | 10/1997 | Kanesaka et al. ............. 502/65 |
| 5,727,385 A | * | 3/1998 | Hepburn ....................... 60/297 |
| 5,762,892 A | * | 6/1998 | Kasahara et al. ......... 423/213.5 |
| 5,911,960 A | * | 6/1999 | Miyoshi et al. .......... 423/213.5 |
| 5,958,826 A | * | 9/1999 | Kurokawa et al. .......... 502/303 |
| 5,990,038 A | * | 11/1999 | Suga et al. .................. 502/303 |
| 6,010,673 A | * | 1/2000 | Kanazawa et al. ....... 423/213.5 |
| 6,047,544 A | * | 4/2000 | Yamamoto et al. ........... 60/285 |
| 6,066,587 A | * | 5/2000 | Kurokawa et al. ............ 502/66 |
| 6,149,877 A | * | 11/2000 | Ogai ........................... 422/180 |
| 6,161,378 A | * | 12/2000 | Hanaoka et al. .............. 60/286 |

FOREIGN PATENT DOCUMENTS

| | | |
|---|---|---|
| DE | 197 42 705 A1 | 4/1998 |
| EP | 0 582 917 A1 | 2/1994 |
| EP | 0 852 966 A1 | 7/1998 |
| EP | 0 857 510 A1 | 8/1998 |
| JP | 8-281106 | 10/1996 |
| JP | 9-85093 | 3/1997 |
| JP | 10-151357 | 6/1998 |

* cited by examiner

Primary Examiner—Steven P. Griffin
Assistant Examiner—Cam N. Nguyen
(74) Attorney, Agent, or Firm—Nixon Peabody LLP; Donald R. Studebaker

(57) ABSTRACT

An exhaust gas purifying catalyst contains a NOx absorbing component which comprises at least one kind of element selected from a group of alkaline earth metals, a group of alkaline metals and a group of rare earth elements and a component, other than the NOx absorbing component, selected between K and Na. The catalyst has a such a structure that the component other than the NOx absorbing component is brought into contact with an exhaust gas before the NOx absorbing component is brought into contact with the exhaust gas.

5 Claims, 1 Drawing Sheet

METHOD OF PRODUCING EXHAUST GAS PURIFYING CATALYST AND CATALYST PRODUCED THEREBY

BACKGROUND OF THE INVENTION

1 Field of the Invention

The present invention relates to an exhaust gas purifying catalyst and a method of producing the exhaust gas purifying catalyst.

2 Description of the Related Art

There have been known exhaust gas purifying catalysts which comprise two catalytic layers, a first one of the two catalytic layers containing at least one noble metal selected from a group of Pt, Rh and Pd which is partly or entirely supported on ceria, Ba and K and a second one of the two catalytic layers containing at least one noble metal selected from the group of Pt, Rh and Pd but not containing K, which are formed in the form of double layers on a substrate. Such an exhaust gas purifying catalyst shows an increased ability to absorb NOx in a lean atmosphere (which refers to the atmosphere containing oxygen in excess as compared with exhaust gas produced with combustion of a stoichiometric air-to-fuel mixture) by virtue of the first catalytic layer and functions as a three-way catalyst in exhaust gas produced from combustion of a stoichiometric air-to-fuel mixture. In the exhaust gas purifying catalyst K and Na work as NOx absorbing component and the noble metal supported on ceria works as a promoter for NOx absorption. One of such exhaust gas purifying catalyst is known from, for example, Japanese Unexamined Patent publication No. 8-281106. Another type of exhaust gas purifying catalyst that is known from, for example, Japanese Unexamined Patent publication No. 9-85093, comprises an alumina coating layer impregnated with a noble metal such as Pt formed on a substrate, the alumina coating layer being further impregnated with K, Na and Li. In the exhaust gas purifying catalyst these K, Na and Li are made apt to produce a compound carbonate which puts the exhaust gas purifying catalyst in an unstable state so as to show improved NOx adsorbing and desorbing characteristics and makes it recover from sulfur-poisoning to gain high NOx conversion efficiency. Still another type of exhaust gas purifying catalyst such as known from, for example, Japanese Unexamined Patent publication No. 10-151357 comprises an alumina under layer formed on a honeycomb substrate and an over layer formed on the under layer. These under and over layers are impregnated with a mixture of a solution of a NOx absorbent such as Ba, K and Na and a solution of a noble metal with an effect of improving the dispersibility of the NOx and the noble metal.

SUMMARY OF THE INVENTION

It is an object of the invention to provide an exhaust gas purifying catalyst which has improved resistance to sulfur-poisoning ability of a NOx absorbent such as Ba adapted to absorb NOx in the lean atmosphere (e.g. the exhaust gas with oxygen concentration higher than 4% for example from combustion of a lean air-fuel mixture at an air-to-fuel ratio ranging from 16 to 100) so as thereby to increase its NOx conversion efficiency.

It is another object of the present invention to provide a method of producing an exhaust gas purifying catalyst which has improved resistance to sulfur-poisoning of a NOx absorbent such as Ba adapted to absorb NOx in the lean atmosphere, e.g. in the exhaust gas from combustion of a lean air-to-fuel mixture with an air-to-fuel ratio ranging from 16 to 100 so as thereby to increase its NOx conversion efficiency.

In order to accomplish the foregoing objects of the present invention, an exhaust gas purifying catalyst contains a combination of a NOx absorbing component such as Ba and a K component or a Na component. The NOx absorbing component comprises at least one kind of element selected from a group of alkaline earth metals, a group of alkaline metals and a group of rare earth elements. In the exhaust gas purifying catalyst the K component or the Na component is distributed so as to be made exposed to an exhaust gas prior to the NOx absorbing component. While it has been known in the art that K and Na have the function of absorbing NOx, noticing the respect that K and Na are able to absorb S, the exhaust gas purifying catalyst is adapted so that the NOx absorbing component is less poisoned with S by causing the K component or the Na component to contact with an exhaust gas prior to contact of the NOx component with the exhaust gas so as thereby to absorb S contains more than 7 ppm in the exhaust gas. Although the K component or the Na component is transformed into the form of a carbonate as a result of calcination during preparing the exhaust gas purifying catalyst, when encountering a sulfuric component in an exhaust gas, it absorbs the sulfuric component and is consequently transformed into a sulfate such as $K_2SO_4$ or $Na_2SO_4$. However, when the exhaust gas lowers its oxygen content, e.g. when a stoichiometric air-to-fuel ratio is reached, the sulfate is easily decomposed into carbonate. In particular, in the case of a combination of NOx absorbing component and K, even after the catalyst is exposed to a high temperature exhaust gas, it shows a high NOx conversion efficiency and is therefore favorable to improving its heat resistance. A component selected from a group of alkaline earth metals, a group of alkaline metals and a group of rare earth elements, in particular Ba, is preferable as the NOx absorbing component. Moreover, a combination of Ba and another NOx absorbing component may be employed.

In the case of placing a K component or a Na component in an exhaust gas stream upstream from the NOx absorbing component so as to expose the K component or the Na component to the exhaust gas prior to the NOx absorbing component, the catalyst may be comprised of a catalytic layer containing a K component or a Na component (which is referred to as a second catalytic layer) and a catalytic layer containing NOx absorbing component (which is referred to as a first catalytic layer) which are coated side by side on a substrate and placed in an exhaust gas stream so that the second catalytic layer is positioned upstream from the first catalytic layer. Otherwise the catalyst may be preferably comprised of the first catalytic layer formed as an under catalytic layer on a substrate and the second catalytic layer formed as an over catalytic layer over the first catalytic layer. In such the catalyst the first catalytic layer is preferable to contain a noble metal, such as, Pt or Rh in addition to the NOx absorbing component. The noble metal, on one hand, converts NOx in an exhaust gas while the exhaust gas is at higher oxygen contents and, on the other hand, converts NOx that is discharged from the NOx absorbing component while the exhaust gas is at lower oxygen content. As support of the noble metal alumina, preferably γ-alumina and/or cerium may be employed. Since $CeO_2$ has oxygen absorption ability ($O_2$ storage effect), when the engine operates at an approximately stoichiometric air-to-fuel ratio, i.e. an excess air ratio (of approximately one (1), it causes the catalyst to act as a three-way catalyst, so as to effectively lower levels of other emissions, such as, hydrocarbon (HC) and carbon monoxide (CO) in addition to NOx.

The second catalytic layer is preferable to contain zeolite supporting a transition metal component in addition to a K component or a Na component. The transition metal supported on the zeolite activates NO and HC, so as to increase the NOx conversion efficiency of the catalyst. That is, NO in an exhaust gas is oxidized to $NO_2$ which is easily absorbed by the NOx absorbing component, and HC is activated through partial oxidization and cracking. The activated HC promotes a reduction-decomposition reaction of NOx. Noble metals, particularly Pt is preferable as the transition metal and using Pt together with Rh is more preferable. MFI type is preferable as zeolite.

K component or Na component can be included not only in the second catalytic layer but also in the first catalytic layer. In this case it is preferable that the second catalytic layer has a higher concentration of those components than the first catalytic layer. This is because it can reduce an amount of S to diffuse into the first catalytic layer by making S in the exhaust gas first absorbed into the K component or the Na component in the second catalytic layer over the first catalytic layer, which prevents the NOx absorbent in the first catalytic layer from sulfur-poisoning.

NOx absorbing component may also be included in both first catalytic layer and second catalytic layer. In this case it is preferable that the concentration of K component or Na component in the second catalytic layer is higher than the concentration of the NOx absorbing component in order to cause S in the exhaust gas to be absorbed into the K component or the Na component so as thereby to prevent the NOx absorbing component from sulfur-poisoning.

A method suitable for producing the above-mentioned exhaust gas purifying catalyst comprises the steps of:

forming a first layer containing alumina on a substrate;

forming a second layer containing zeolite over the alumina containing layer;

impregnating both alumina containing layer and second zeolite containing layer with a solution of a mixture of either one of K or Na and at least one element selected from a group of alkaline metals other than K and Na, alkaline earth metals and rare earth elements;

drying the alumina containing layer and the zeolite containing layer impregnated with the solution, and calcining the alumina containing layer and the zeolite containing layer after drying.

This method is corroborated by the fact that K ions or Na ions become carried more in the zeolite containing layer because K ions or Na ions are adsorbed by the zeolite more easily and move in a solution more easily than ions of alkaline metals other than K and Na, alkaline earth metals and rare earth elements. The movement of the ions in a solution is made while a solvent of the solution evaporates from the alumina containing layer and the zeolite containing layer during calcining these layers after the impregnation.

As explained above, the exhaust gas purifying catalyst of the invention comprising NOx absorbing component and a K component or a Na component in which the K-component or the Na-component is brought into contact with an exhaust gas before the NOx absorbing component is brought into contact with the exhaust gas can controlling sulfur-poisoning of the NOx absorbing component as a result of absorption of S in the exhaust gas by the K component or the Na component and has the advantage of increasing the NOx conversion efficiency thereof. Furthermore a combination of the K-component and the NOx absorbing component is contributory to improvement of heat resistance of the exhaust gas purifying catalyst.

According to the invention of producing the catalyst for purifying exhaust gas mentioned above, the catalyst is produced by the steps comprising: forming a layer containing alumina on a support material; forming a layer containing zeolite on the layer containing alumina; impregnating both alumina containing layer and zeolite containing layer with a solution of a mixture of either one of K or Na and at least one element selected from a group of alkaline metals other than K and Na, alkaline earth metals and rare earth elements, and then drying and calcining the layers. Thus the catalyst which carries a larger amount of K or Na in the outer layer, i.e. the containing zeolite layer, than the under layer can be obtained.

BRIEF DESCRIPTION OF DRAWINGS

The foregoing and other objects and features of the present invention will be clearly understood when reading the following description regarding preferred embodiments thereof in conjunction with the accompanying drawings, in which.

DETAILED DESCRIPTION OF THE INVENTION

Figure 1:
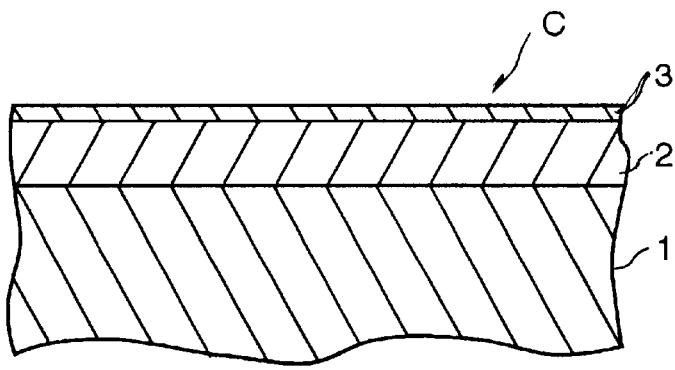
FIG. 1 is an enlarged fragmentary sectional view showing a layered structure of an exhaust gas purifying catalyst of the invention.

Referring to the drawings, in particular, to FIG. 1 which shows an exhaust gas purifying catalyst (which is hereafter referred to as a catalyst for simplicity) C for purifying exhaust gases in accordance with an embodiment of the invention, the catalyst C is installed in an exhaust line of a lean burn engine (not shown) of an automobile to lower emission levels of environmental pollutants such as hydrocarbons (HC), carbon monoxide (CO) and oxides of nitrogen (NOx) from exhaust gases while the lean burn engine operates with an air-fuel mixture at a stoichiometric air-fuel ratio and further effectively to lower an emission level of NOx while it operates with a lean air-fuel mixture. That is, this catalyst C has a NOx conversion effect in an atmosphere provided as a result of combustion of a lean air-fuel mixture where an oxygen concentration of the atmosphere is between approximately 4 and 20% and an air-to-fuel ratio A/F of the lean air-fuel mixture is between approximately 16 and 100 or 18 and 100. The catalyst C comprises, for example, a honeycomb-shaped substrate 1 made of cordierite which has a superior heat resistance, a first catalytic layer (an under catalytic layer) 2 formed on the honeycomb-shaped substrate 1 and a second catalytic layer (an outer catalytic layer) 3 formed over the first catalytic layer 2.

The first catalytic layer 2 comprises a first noble metal such as Pt and a NOx absorbing component such as Ba, a powdered first support material made of, for example, a mixture of alumina and $CeO_2$ on which the first noble metal and NOx absorbing component are carried, binder for binding the powdered support material and holding it on the honeycomb-shaped substrate 1 and, if necessary, a K component or a Na component. The second catalytic layer 3 comprises a second noble metal such as Pt or Rh, one of a K component and a Na component, a powdered second support material, such as zeolite, which carries the second noble metal and an absorbing component for absorbing the K component or the Na component thereon, binder for binding the powdered support material and holding it on the honeycomb-shaped substrate 1 and, if necessary, a NOx absorbing component. While Ba is mainly used as the NOx absorbing component, another alkali earth metal, an alkaline metal or a rare earth element, or otherwise, more-than-one elements selected from those groups may be used as the NOx absorbing component. As $CeO_2$, although ceria can be used, in light of providing a higher heat resistance, compound oxide made of a mixture of cerium and zirconium is preferable. The content of impurities is preferably less than 1% in each of the first and second catalytic layers 2 and 3.

The catalyst C was basically prepared by a process described below.

A catalyst powder was prepared by carrying the second noble metal on the second support material by using a drying-solidifying process. A solution of a mixture was separately prepared by mixing the first noble metal, the NOx absorbing component and either one of a K component and a Na component together. A slurry was further separately prepared by mixing the first support material, the binder and water together. The mixture slurry was wash-coated on the honeycomb-shaped substrate 1, and then dried and calcined to form the under catalytic layer 2. On the other hand, a slurry, which was prepared by mixing the catalyst powder, binder and water together, was wash-coated on the under catalytic layer 2 on the honeycomb-shaped substrate 1, and then dried and calcined to form an over catalytic layer 3. Subsequently to the process, the under and over catalytic layers were impregnated with the mixture solution containing the first noble metal, the NOx absorbing component and the either one of a K component and a Na component, and then dried and calcined. Evaluation of Catalyst I (Resistance to Sulfur-poisoning).

In order to evaluate the catalyst in connection with resistance to sulfur-poisoning, the following six different catalysts, namely comparative catalysts CC-I to CC-III and sample catalysts EC-IV to EC-VI as examples of the invention, were prepared.

The processes of the preparation of these comparative and sample catalysts were prepared by the same process with an exception of an impregnated solution used at the last process.

Preparation of Pt-Rh/MFI Catalyst Powder

A Pt-dinitro-diamine solution was mixed with a rhodium nitrate solution such that the weight ratio of Pt to Rh was 75:1. This Pt-Rh mixture solution and MFI zeolite ($SiO_2$/$Al_2O_3$=80) were mixed together to provide a Pt-Rh/MFI mixture solution. This Pt-Rh/MFI mixture solution was sprayed and dried so as thereby to be solidified, and then further dried for one hour at a temperature between approximately 100 and 200° C. and calcined for two hours at a temperature between approximately 500 and 600° C. to produce a Pt-Rh/MFI catalyst powder. Pt and Rh makes up 2.3 weight % of the MFI catalyst powder.

Preparation of Impregnation Solution

An impregnation solution for the comparative catalyst CC-I was prepared by mixing a Pt-dinitro-diamine solution, a rhodium nitrate solution and a barium acetate solution together such that the Pt total content (which hereafter refers to a total amount of Pt from the impregnating solution and the Pt-Rh/MFI catalyst powder) was 6.5 g/L, the Rh total content (which hereafter refers to a total amount of Rh from the impregnating solution and the Pt-Rh/MFI catalyst powder) was 0.1 g/L and the Ba content was 30 g/L. In this instance, the unit "g/L" as used herein shall mean gram weight of a component per one liter of the honeycomb-shaped substrate 1 on which each component is carried.

An impregnation solution for the comparative catalyst CC-II was prepared by mixing a Pt-dinitro-diamine solution, a rhodium nitrate solution and a barium acetate solution together such that the Pt total content, the Rh total content and the Ba content were 6.5 g/L, 0.1 g/L and 60 g/L, respectively.

An impregnation solution for the comparative catalyst CC-III was prepared by mixing a Pt-dinitro-diamine solution, a rhodium nitrate solution, a barium acetate solution and a strontium acetate solution together such that the Pt total content, the Rh total content, the Ba content and the Sr content were 6.5 g/L, 0.1 g/L, 30 g/L and 30 g/L, respectively.

An impregnation solution for the sample catalyst EC-IV was prepared by mixing a Pt-dinitro-diamine solution, a rhodium nitrate solution, a barium acetate solution and a sodium acetate solution together such that the Pt total content, the Rh total content, the Ba content and the Na content were 6.5 g/L, 0.1 g/L, 30 g/L and 30 g/L, respectively.

An impregnation solution for the sample catalyst EC-V was prepared by mixing a Pt-dinitro-diamine solution, a rhodium nitrate solution, a barium acetate solution and a potassium acetate solution together such that the Pt total content, the Rh total content, the Ba content and the K content were 6.5 g/L, 0.1 g/L, 30 g/L and 30 g/L, respectively.

An impregnation solution for the sample catalyst EC-VI was prepared by mixing a Pt-dinitro-diamine solution, a rhodium nitrate solution, a barium acetate solution and a lithium acetate solution together such that the Pt total content, the Rh total content, the Ba content and the Li content were 6.5 g/L, 0.1 g/L, 30 g/L and 30 g/L, respectively.

Forming Under Coating Layer

A first mixture was prepared by mixing γ-alumina and $CeO_2$ together at a weight ratio of 1:1, and a second mixture was subsequently prepared by mixing this first mixture and alumina binder together at a weight ratio of 5:1. Further a slurry was made by adding ion-exchanged water to the second mixture. A honeycomb-shaped substrate 1, whose volume and density were 25 ml and 420 g per one liter of the honeycomb-shaped substrate 1 was dipped in the second mixture slurry, withdrawn and dried after blowing off an excess of the second mixture slurry, and then calcined. In such a wash-coating process, an under coating layer was formed on the honeycomb-shaped substrate 1 such that the weight of the under coating layer after drying was 315 g/L (which was 75% in weight of the honeycomb-shaped substrate).

Forming Outer Coating Layer

A slurry was prepared by mixing the prepared Pt-Rh/MFI catalyst powder and alumina binder together at a weight ratio of 5:1 and then adding ion-exchanged water to the mixture. The mixture slurry was wash-coated over the under coating layer formed on the honeycomb-shaped substrate 1, and then dried and calcined to form an over coating layer such that the weight of the over coating layer after drying was 21 g/L (which was 5% in weight of the honeycomb-shaped substrate).

The impregnation solutions prepared for the comparative and sample catalysts, respectively, were impregnated into the under and over coating layers of the comparative and sample catalysts CC-I to CC-III and EC-IV to EC-VI, respectively. These comparative and sample catalysts CC-I to CC-III and EC-IV to EC-VI were completed by drying and calcining.

Each of the comparative and sample catalysts bore about 131 g/L of γ-alumina, about 131 g/L of $CeO_2$ and about 17.5 g/L of MFI zeolite. The amounts of noble metals and Ba borne on the catalysts were set forth above.

Evaluation of Catalyst I

In order to evaluate performance of the respective catalysts, each fresh catalyst before any heat-aging and/or sulfur-poisoning was mounted on a fixed-bed gas-flow reactor for testing. At the beginning, a simulated gas equivalent to an exhaust gas produced as a result of combustion of a lean air-fuel mixture was flown into the fixed-bed gas-flow reactor until a NOx conversion efficiency becomes stable. Subsequently, the simulated gas was changed in composition so as to be equivalent to an exhaust gas produced as a result of combustion of a rich air-fuel mixture and then changed back to the initial gas composition resulting from the combustion of a lean air-fuel mixture. Measurements of NOx conversion efficiency were made for 130 seconds from a point of time at which the gas composition was switched back for assessment of performance of the catalyst under combustion of a lean air-fuel mixture (which is hereafter referred to as lean NOx conversion efficiency). The temperatures of both tested catalyst and simulated exhaust gas were 350° C. and a space velocity of simulated exhaust gas during the tests was 55,000 $h^{-1}$. The simulated gas compositions are shown in

TABLE I

|  | Lean | Rich |
| --- | --- | --- |
| HC ($C_3H_6$) | 4000 ppmC | ← |
| NO | 250 ppm | ← |
| CO | 0.15% | ← |
| $CO_2$ | 10% | ← |
| $H_2$ | 650 ppm | ← |
| $O_2$ | 7% | 0.5% |
| $H_2O$ | 10% | ← |
| $N_2$ | Remainder | ← |

The respective comparative and sample catalysts were treated by $SO_2$-poisoning in which the catalyst was exposed to a gas consisting of 50 ppm of $SO_2$, 20% of $O_2$ and the reminder of $N_2$ at a temperature of 350° C.flowing at a space velocity of 55,000 $h^{-1}$ for 30 minutes (which is hereafter referred to sulfur-poisoning treatment) and then tested for measuring NOx conversion efficiency in the same manner described above. The result of tests for the fresh catalysts CC-I to CC-III and EC-IV to EC-VI before and after the sulfur-poisoning treatment is shown in FIG. 2.

Figure 2:
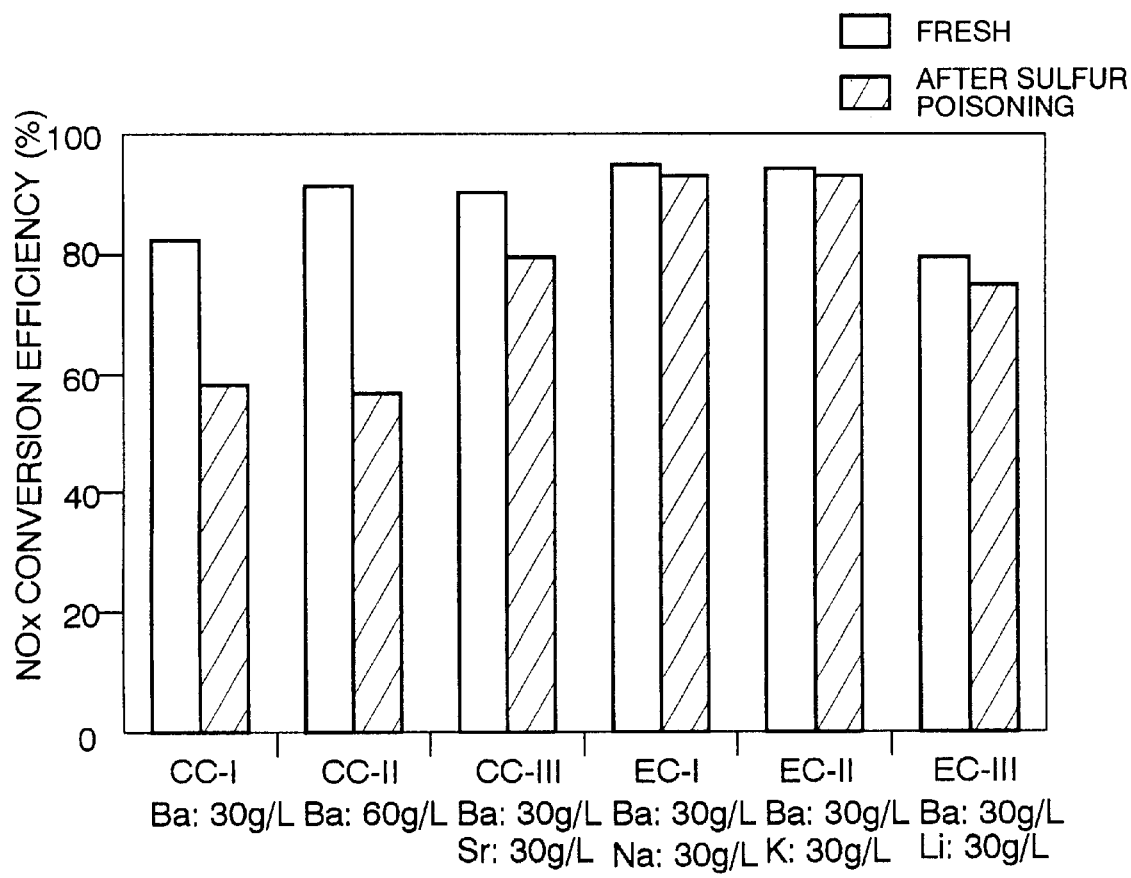
FIG. 2 is a graph showing the relationship between NOx conversion efficiency for sample exhaust gas purifying catalysts as examples of the invention and comparative exhaust gas purifying catalysts before and after sulfur-poisoning treatment.

As apparent in FIG. 2, the sample catalyst EC-VI which was impregnated with Na and the sample catalyst EC-V which was impregnated with K show a drop in NOx conversion efficiency of only 2 to 3% after the sulfur-poisoning treatment as compared before the sulfur-poisoning treatment. This demonstrates that the impregnation with Na or K is very effective to improve resistance to sulfur-poisoning.

To analyze the function of Na and K in the comparative catalysts CC-II and III and sample catalysts EC-IV to EC-VI, the total content of S of the whole catalyst after the S-poisoning treatment in mass %, the volume ratio (%) of CO3 to Ba and the volume ratio (%) of SO4 to Ba on the catalyst surface (the surface of the outer coating layer of the catalyst) observed by means of XPS, and the volume ratio of the additive element X (Sr, Na, K and Li) to Ba in the second catalytic layer (the outer coating layer ) were measured and existing crystals were examined by X-ray diffraction. The result of the measurements and examination is shown in TABLE II in which although the comparative catalyst CC-II has the Ba content 60 g/L but contains no additive element X mentioned above, Ba is listed as an additive element for the sake of convenience.

TABLE II

|  |  | S-content | Surface Concentration (XPS) % | | | |
| --- | --- | --- | --- | --- | --- | --- |
| Catalyst | Element | (%) | $CO_3$/Ba | $SO_4$/Ba | X/Ba | Crystal |
| CC-II | Ba | 0.21 | 8.26 | 0.96 | 0 | $BaCO_3$, $BaSO_4$ |
| CC-III | Sr | 0.23 | 48.26 | 1.63 | 20 | $SrCO_3$ |
| EC-IV | Na | 0.21 | 466.32 | 1.6 | 96 | $BaCO_3$, $BaSO_4$, $Na_2CO_3$ |
| EC-V | K | 0.21 | 124.34 | 7.54 | 95 | $BaCO_3$, $BaSO_4$, $K_2SO_4$ |
| EC-VI | Li | 0.2 | 26.5 | 1.4 | 74 | $BaCO_3$, $BaSO_4$, $Li_2CO_3$ |

It is demonstrated in TABLE II that there is almost no difference in S total content between the catalysts. In other words, all the catalysts have S adsorption thereon in the same level. As for CO3/Ba, the sample catalysts EC-IV and EC-V have higher value than others. Additional elements are placed in decreasing order of value of CO3/Ba as follows; Na>K>Sr>Li>Ba. Because NOx absorption capability is considered to depend on an amount of BaCO3 on the catalyst surface, the sample catalyst EC-IV having Na as an additive element and the sample catalyst EC-V having K as an additive element can be said to have higher NOx absorption capability after the sulfur-poisoning treatment than the comparative catalysts CC-II and CC-III. This result is supposed because Na2CO3 or K2CO3 on the catalyst surface absorbs a S component in the exhaust gas and is converted to Na2SO3 or K2SO4, respectively, which leads to prevention of BaCO3 from Sulfur-poisoning by the amount of S consumed by Na2CO3 or K2CO3. The sample catalysts EC-IV and EC-V have higher values of X/Ba. It seems that Na or K is segregated to the catalyst surface into which S in the exhaust gas is absorbed to reduce the amount of Ba poisoned with S.

With respect to the ratio of SO4/Ba, the sample catalyst EC-V has a significantly higher value than the comparative catalyst CC-II. This is supposed because the value of the sample catalyst EC-V includes SO4 from K2SO4 which is produced by absorbing SO4 into K on the catalyst surface. A higher value of CO3/Ba of the sample catalyst EC-V supports the supposition.

As for the sample catalyst EC-IV, its value of SO4/Ba is low and K2SO4 is not detected by X-ray diffraction. It is supposed not because the S component in the exhaust gas is not absorbed into Na but because the S component is diffused into the inside of the catalyst and absorbed by Na existing therein, which causes surface concentration of K2SO4 to be low. A significantly higher value of CO3/Ba of the sample catalyst EC-IV supports the supposition.

Evaluation of Catalyst II

In order to evaluate the impact of Ba and K contents on resistance to Sulfur-poisoning, an investigation test was made by measuring NOx conversion efficiency and deterioration rate and the result is shown in TABLE III. Sample catalyst EC-IV with an additive element Na has a higher resistance to Sulfur-poisoning as well as the sample catalyst EC-V with an additive element K. However, taking it into account that Na is not so heat-resistant, the sample catalyst EC-V is more useful. Further, an investigation test was conducted on the sample catalyst EC-V by varying the contents of Ba and K with respect to the resistant performance to sulfur-poisoning. The contents of Ba and K are shown in TABLE III and the measurements of NOx conversion efficiency and S-poisoning treatment were the same as those in the previous test for Evaluation of Catalyst I. Also kinds and amounts of support materials and kinds and amounts of catalytic metals used in the test were the same as the sample catalyst EC-V previously explained. The result of the test is shown in TABLE III.

TABLE III

| | | NOx Conversion Efficiency (%) | | |
|---|---|---|---|---|
| Ba (g/L) | K (g/L) | Before Sulfur-Poisoning Treatment | After Sulfur-Poisoning Treatment | Deterioration Rate (%) |
| 30 | 0 | 83 | 58 | 30 |
| 30 | 15 | 94 | 84 | 10 |
| 30 | 30 | 93 | 90 | 3 |
| 15 | 15 | 95 | 86 | 9 |
| 15 | 30 | 92 | 89 | 3 |
| 60 | 0 | 92 | 58 | 37 |

From TABLE III, it is understood that the content of Ba has no significant effect on NOx conversion efficiency of the catalyst after the S-poisoning treatment whether it is 15 g/L or 30 g/L and, however, the content of K shows higher NOx conversion efficiency of the catalyst after the S-poisoning treatment when it is 30 g/L than when it is 15 g/L and that deterioration rate indicates the effect by the content of K.

Evaluation of Catalyst III

In order to evaluate the impact of the contents of Ba and K on heat-resistance, an investigation test was made on the sample catalyst EC-V by measuring NOx conversion efficiency with varying the contents of Ba and K and the result is shown in TABLE IV. The contents of Ba and K were varied as shown in TABLE IV and the manner of the measurement of NOx conversion efficiency was the same as in the test for the previous evaluation of catalyst. Also kinds and amounts of support materials and kinds and amounts of catalytic metals used in the sample catalyst were the same as those of the sample catalyst EC-V used in the previous test. Heat treatment (oven-aging) was conducted to evaluate heat-resistance under the condition that the fresh sample catalyst EC-V was oven-aged for 24 hours at a temperature of 900° C.

TABLE IV

| | | NOx Conversion Efficiency (%) | |
|---|---|---|---|
| Ba (g/L) | K (g/L) | Before Heat-treatment | After Heat-treatment (900° C. × 24 h) |
| 30 | 0 | 83 | 31 |
| 30 | 15 | 94 | 37 |
| 30 | 30 | 93 | 47 |
| 0 | 15 | 91 | 4 |
| 15 | 15 | 95 | 46 |

TABLE IV-continued

| | | NOx Conversion Efficiency (%) | |
|---|---|---|---|
| Ba (g/L) | K (g/L) | Before Heat-treatment | After Heat-treatment (900° C. × 24 h) |
| 15 | 30 | 92 | 22 |
| 0 | 30 | 98 | 8 |
| 60 | 0 | 92 | 25 |

TABLE IV indicates that the catalyst obtains good heat-resistance when the content of Ba is approximately the same as the content of K. In terms of the number of moles, when the number of moles of K is 3 to 4 times that of Ba, the catalyst with good heat-resistance is obtained. When the content of Ba is nothing, the catalyst does not obtain good heat-resistance even if it has the relatively high content of K.

Evaluation of Catalyst IV

In order to evaluate the impact of noble metals on heat-resistance, an investigation test was made by measuring NOx conversion efficiency. Noble metal contents of the sample catalysts EC-V containing Ba and K and the comparative catalysts containing Ba used in the test were as follows:

Sample catalyst A:
  Pt total content 6.5 g/L
  Rh total content 0
Sample catalyst B:
  Pt total content 3.5 g/L
  Rh total content 0
Sample catalyst C:
  Pt total content 6.5 g/L
  Rh total content 0.1 g/L
Comparative catalyst D:
  Pt total content 6.5 g/L
  Rh total content 0
Comparative catalyst E:
  Pt total content 3.5 g/L
  Rh total content 0

The measurement of NOx conversion efficiency and heat-aging conditions were the same as those in the previous test for Evaluation of Catalyst II with an exception of the space velocity of the simulated exhaust gas, which was 25,000 h$^{-1}$, and the temperature of the simulated gas, which were 350 and 400° C. The result of the test is shown in TABLE V.

TABLE V

| | NOx Conversion Efficiency (%) | | | |
|---|---|---|---|---|
| | 350° C. | | 400° C. | |
| Catalyst | Before Heat-treatment | After heat-treatment 900° C. × 24 h | Before Heat-treatment | After heat-treatment 900° C. × 24 h |
| A: Ba 30 g/L; K 30 g/L, Pt 6.5 g/L | 98 | 88.2 | 97 | 85.4 |
| B: Ba 30 g/L; K 30 g/L, Pt 3.5 g/L | 96 | 52.9 | 96 | 62.2 |
| C: Ba 30 g/L; K 30 g/L, Pt 6.5 g/L; Rh 0.1 g/L | 97 | 72.2 | 97 | 70.9 |
| D: Ba 30 g/L; Pt 6.5 g/L | 98 | 66.4 | 93 | 60.5 |
| E: Ba 30 g/L; Pt 3.5 g/L | 98 | 47.9 | 92 | 56.3 |

TABLE V indicates that there is almost no difference between the fresh catalyst but difference between them after heat-aging. Apart from the case of the comparative catalysts, while the tested catalysts show no difference of NOx conversion efficiency, the catalyst with 6.5 g/L of Pt has evidently higher NOx conversion efficiency than the catalyst with 3.5 g/L of Pt, and the sample catalysts show almost no difference of NOx conversion efficiency between inlet temperatures of 350 and 400° C. This means the catalyst with higher Pt content has better heat-resistance and higher performance for NOx conversion efficiency at higher temperatures.

Evaluation of Catalyst (On-board Evaluation)

The following catalysts (a), (b) and (c) were prepared and installed in an exhaust line of a lean-burn engine (piston displacement: 1.5 liters, maximum A/F: 25) for measurement of NOx conversion efficiency in total under both lean-burn condition and N-EC mode condition (combination of low speed mode ECR-15 and high speed mode EUDC).

Catalyst (a): Ba 30 g/L; K 30 g/L; Pt 6.5 g/L; Rh 0.1 g/L
Catalyst (b): Ba 15 g/L; K 15 g/L; Pt 6.5 g/L; Rh 0.1 g/L
Catalyst (c): Ba 30 g/L; Pt 6.5 g/L; Rh 0.1 g/L Each group of catalysts (a), (b), (c) were classified by three aging conditions, namely catalysts before aging, catalysts after oven-aging (heat-aging for 24 hours at 900° C. in atmosphere) and catalysts after engine-aging (24 hours exposure to an exhaust gas from the engine which operates at an air excess ratio $\lambda=1$ so as to vary the exhaust gas temperature alternately between 930 and 550° C.). Kinds of support materials and structure of coating layer of each catalyst used in the test were the same as those of the sample catalyst EC-V previously explained. The result is shown in TABLE VI.

TABLE VI

| Catalyst | Condition | Total NOx Conversion Efficiency (%) | NOx conversion Efficiency under Lean-burn Condition (%) |
|---|---|---|---|
| (a): | Before Aging | 88 | 100 |
| Ba 30 g/L, K 30 g/L | After Oven-aging | 57 | 68 |
| Pt 6.5 g/L, Rh 0.1 g/L | After Engine-aging | 68 | 61 |
| (b): | Before Aging | 90 | 98 |
| Ba 15 g/L, K 15 g/L | After Oven-aging | 68 | 58 |
| Pt 6.5 g/L, Rh 0.1 g/L | After Engine-aging | 71 | 61 |
| (c): | Before Aging | 82 | 77 |
| Ba 30 g/L, | After Oven-aging | 70 | 61 |
| Pt 6.5 g/L, Rh 0.1 g/L | After Engine-aging | 68 | 54 |

TABLE VI indicates that the sample catalysts (a) and (b) before aging show better performance than the comparative catalyst (c) before aging and have higher total NOx conversion efficiency than the comparative catalyst under lean-burn condition. This means K is useful as an additive element in the catalyst.

While the invention has been described in detail with respect to specific preferred embodiments thereof, it will be apparent that upon a reading and understanding of the foregoing, variations thereof may occur to those skilled in the art which lie within the scope of the appended claims.

What is claimed is:

1. A catalyst disposed in an exhaust passage of a lean burn engine for purifying an exhaust gas containing sulfur (S) and NOx, said catalyst comprising:

a substrate;

a first catalyst layer formed on said substrate, said first catalyst layer containing barium (Ba) as a NOx absorbing component which absorbs NOx in an exhaust gas having an excess oxygen concentration greater than 5%; and a second catalyst layer formed over said first catalyst layer, said second catalyst layer containing one of potassium (K) and sodium (Na), and barium further comprising (Ba) at a higher concentration than that of said first catalyst layer.

2. A catalyst as defined in claim 1, wherein said first layer further contains a noble metal.

3. A catalyst as defined in claim 1, wherein said second layer contains zeolite on which a transition metal is carried.

4. A catalyst as defined in claim 1, wherein said first layer further contains ceria.

5. A catalyst disposed in an exhaust passage of a lean burn engine for purifying an exhaust gas containing sulfur (S) and NOx, said catalyst comprising:

a substrate;

a first catalyst layer formed on said substrate, said first catalyst layer containing barium (Ba) as a NOx absorbing component which absorbs NOx in an exhaust gas having an excess oxygen concentration greater than 5%; and a second catalyst layer formed over said first catalyst layer, said second catalyst layer containing potassium (K) approximately three to four times in the number of moles as much as said barium (Ba) of said first catalyst layer and zeolite on which a transition metal is carried;

wherein said catalyst is structured such that said potassium (K) is brought into contact with sulfur (S) in an exhaust gas before said barium (Ba) is brought into contact with said sulfur (S) in said exhaust gas.

* * * * *